(12) United States Patent
Feneyrou et al.

(10) Patent No.: US 9,441,949 B2
(45) Date of Patent: Sep. 13, 2016

(54) METHOD FOR GENERATING M DEMODULATION SIGNALS USING AT LEAST ONE PRIMARY INTERFEROMETER

(71) Applicant: THALES, Courbevoie (FR)

(72) Inventors: Patrick Feneyrou, Palaiseau (FR); Grégoire Pillet, Palaiseau (FR); Jean Minet, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/698,658

(22) Filed: Apr. 28, 2015

(65) Prior Publication Data

US 2015/0308811 A1  Oct. 29, 2015

(30) Foreign Application Priority Data

Apr. 28, 2014 (FR) ..................................... 14 00991

(51) Int. Cl.
*G01B 9/02* (2006.01)
*G01S 17/32* (2006.01)
(Continued)

(52) U.S. Cl.
CPC ......... *G01B 9/02083* (2013.01); *G01S 7/4915* (2013.01); *G01S 17/325* (2013.01); *G01S 13/343* (2013.01); *G01S 17/36* (2013.01)

(58) Field of Classification Search
CPC .......... G01B 9/02083; G01B 9/02087; G01S 13/86; G01S 17/325; G01S 7/4915; G01S 13/343; G01S 17/00–17/95; G02F 1/3517
See application file for complete search history.

(56) References Cited

U.S. PATENT DOCUMENTS

| 5,452,086 A | * | 9/1995 | Bunn | ................. | G01D 5/35303 |
| | | | | | 250/227.12 |
| 7,697,849 B2 | * | 4/2010 | Kamio | ................. | H04B 10/677 |
| | | | | | 398/161 |

(Continued)

FOREIGN PATENT DOCUMENTS

EP    0849622 A2    6/1998

OTHER PUBLICATIONS

Barber et al., Linearization of Ultra-broadband Optical Chirps for Precision Length Metrology, Conference on Lasers and Electro-Optics (CLEO) and Quantum Electronics and Laser Science Conference (QELS), May 16-21, 2010, pp. 1-2, San Jose, USA, IEEE.

(Continued)

*Primary Examiner* — Michael P Lapage
(74) *Attorney, Agent, or Firm* — Knobbe, Martens, Olson & Bear, LLP

(57) ABSTRACT

A method for generating M demodulation signals is disclosed. In one aspect, the method includes: providing M input signals, injecting each input signal into at least one first interferometer, and detecting M demodulation signals. The method also includes choosing M positive integers that are not all equal to zero and computing M demodulation signals. The $i^{th}$ demodulation signal being the product of $R_i+1$ functions, $R_i$ being the chosen integer that corresponds to the first delay of the $i^{th}$ first interferometer, and the $p^{th}$ function being equal to $S_{t,p}(t)=S(t-p\tau_i)$, where p is an integer between 0 and $R_i$, $\tau_i$ is the first delay introduced by the delay line of the $i^{th}$ first interferometer, and S is a transform of the signal at the output of the $i^{th}$ first interferometer.

10 Claims, 7 Drawing Sheets

(51) Int. Cl.
  *G01S 7/491* (2006.01)
  *G01S 17/36* (2006.01)
  *G01S 13/34* (2006.01)

(56) References Cited

U.S. PATENT DOCUMENTS

2004/0105087 A1* 6/2004 Gogolla .................. G01S 7/497
                                                          356/3
2009/0251361 A1* 10/2009 Beasley .................. G01S 7/354
                                                          342/169
2010/0085992 A1  4/2010 Rakuljic et al.
2011/0080580 A1  4/2011 Fermann et al.
2013/0215919 A1  8/2013 Aflatouni et al.

OTHER PUBLICATIONS

French Search Report dated Dec. 30, 2014, for French Patent Application No. 1400991 filed Apr. 28, 2014.

* cited by examiner

US 9,441,949 B2

METHOD FOR GENERATING M DEMODULATION SIGNALS USING AT LEAST ONE PRIMARY INTERFEROMETER

CROSS-REFERENCE TO RELATED APPLICATIONS

This application claims benefit under 35 U.S.C. §119 of French Application No. 14 00991, filed Apr. 28, 2014, which is herein incorporated by reference its entirety.

BACKGROUND

1. Technological Field

The described technology generally relates to a method for generating M demodulation signals, M being a strictly positive integer. The described technology also relates to a method for demodulating a signal to be demodulated by at least M signals obtained by implementing such a method, a device able to implement such a method for generating M demodulation signals, and a detection system comprising such a device.

2. Description of the Related Technology

The described technology applies to the field of the detection and analysis of at least one target by electromagnetic waves, for example within radar or lidar applications.

The target is for example a hard target or a diffuse target.

"Hard target" generally refers to a solid object.

"Diffuse target" generally refers to a gas or a mixture of gases, optionally including particles in suspension whose dimensions are of the same order of magnitude as the wavelength of the electromagnetic waves.

Such a detection is for example intended to measure physical properties relative to the atmosphere, to produce a wind map, or to obtain distance and/or speed measurements relative to a hard target.

Traditionally, an electromagnetic wave is emitted from a source to the target and diffused by the target in a diffused wave. Part of the diffused wave is collected and analyzed to deduce the desired characteristics of the target therefrom. Desirably, the analysis done on the collected wave is a spectral analysis. More specifically, rays are sought in the spectrum of the collected wave, the frequency of the rays being representative of a property relative to the target.

"Spectrum" of the signal refers to the spectral power density of that signal.

The frequency of the emitted wave generally being comprised between several gigahertz and several hundred terahertz, it is desirable to transpose the spectrum of the collected wave to low frequencies to perform the spectral analysis, for instance frequencies below several gigahertz, to allow processing by the usual measuring instruments so as to detect the previously described rays.

To that end, it is known to make the collected wave interfere with part of the transmitted wave, also called "local oscillator", and to record the resulting beat signal, then to perform the spectral analysis step on that beat signal, generally in baseband, or around a predetermined low frequency equal to the difference between the carriers of the collected wave and the emitted wave.

However, the wave sources not being perfect, the wave generated by a given source experiences fluctuations over time, for example fluctuations in intensity and/or fluctuations of the time phase of the generated wave.

Due to these fluctuations, at a given moment the collected wave for example has a phase partially decorrelated from the wave emitted at that same moment, with part of which the collected wave is mixed. This decorrelation results, relative to the ideal case with no fluctuations, in an enlargement of the rays of interest in the spectrum of the beat signal, combined with a decrease of the intensity of the rays.

It is known to demodulate the beat signal by a predetermined reference signal, chosen based on the distance at which the target is located. The predetermined reference signal is suitable for partially compensating the fluctuations of the wave source, in particular its phase fluctuations.

Nevertheless, such a method is not fully satisfactory.

In fact, the reference signal is not suitable for compensating the actual fluctuations of the wave source over time. The compensation for the broadening of the rays of interest is therefore limited.

SUMMARY OF CERTAIN INVENTIVE ASPECTS

One objective of certain inventive aspects is therefore to propose a method for processing the collected signal leading to more effective treatment of the broadening of the rays of interest.

To that end, one inventive aspect relates to a method of the aforementioned type, comprising the following steps:

providing M input signals;

injecting each input signal into at least one first interferometer, the first interferometer including:

an input in which the input signal is injected, a first arm and a second arm, the second arm comprising a first delay line introducing a first delay, an output via which an interference signal exits corresponding to the interference between a signal from the first arm and a signal from the second arm, detecting M output signals, each output signal being a signal depending on the interference signal obtained at the output of each first interferometer;

choosing M positive integers that are not all equal to zero;

computing M demodulation signals, the $i^{th}$ demodulation signal being the product of $R_i+1$ functions, $R_i$ being the chosen integer that corresponds to the first delay of the $i^{th}$ first interferometer, the $p^{th}$ function being equal to:

$$S_{i,p}(t)-S(t-p\tau_i)$$

where p is an integer comprised between 0 and $R_i$, $\tau_i$ is the first delay introduced by the delay line of the $i^{th}$ first interferometer and S is a transform of the signal at the output of the $i^{th}$ first interferometer.

According to other advantageous aspects, the method comprises one or more of the following features, considered alone or according to any technically possible combination:

at least one $i^{th}$ first interferometer is connected to N second interferometers, N being a strictly positive integer, the $j^{th}$ second interferometer, j being an integer comprised between 1 and (N−1), including:

an input, a first arm and a second arm, the second arm comprising a $j^{th}$ delay line introducing a $j^{th}$ second delay, an output via which a $j^{th}$ interference signal exits corresponding to the interference between a signal from the first arm and a signal from the second arm of the $j^{th}$ second interferometer, the output of the $j^{th}$ second interferometer being connected to the input of the $(j+1)^{th}$ second interferometer;

the output of the first interferometer being connected to the input of the first second interferometer, the method further comprising the following steps:

detecting the $i^{th}$ interference signal obtained at the output of the $N^{th}$ second interferometer;

choosing N positive integers that are not all equal to zero;

computing N demodulation signals, the $j^{th}$ demodulation signal being the product of $K_j+1$ functions, $K_j$ being the selected integer that corresponds to the delay of the $j^{th}$ third interferometer, the $p^{th}$ function being equal to:

$$S_{j,p}(t)=S(t-p\tau_j)$$

where p is an integer comprised between 0 and $K_j$ and S is a transform of the signal at the output of the $N^{th}$ third interferometer;

at least one arm of an interferometer includes a third interferometer, the third interferometer comprising:

an input in which part of the input signal of the interferometer is injected;

a first arm and a second arm, the second arm comprising a delay line introducing a third delay, an output via which a second interference signal exits corresponding to the interference between a signal from the first arm of the interferometer and a signal from the second arm of the interferometer;

the second interference signal being conveyed toward the output of the interferometer;

the ratio between the largest delay introduced by a delay line and the smallest delay introduced by another delay line is desirably greater than 5, desirably greater than 10, for example greater than 20;

the input signal comes from a remote detection device having a predetermined range, and in which at least one delay line is an optical fiber, the length of which is desirably less than or equal to the range, advantageously less than one fifth of the range, for example less than one tenth of the range.

Furthermore, another aspect relates to a demodulation method, comprising the following steps:

providing a signal to be demodulated;

successively demodulating the signal to be demodulated using at least M demodulation signals obtained by implementing the method for generating M demodulation signals as defined above.

Furthermore, another aspect relates to the use of the demodulating method as defined above to determine the speed and position of a target.

Furthermore, another aspect relates to a device for generating M demodulation signals, M being a strictly positive integer, comprising:

M first interferometers, each first interferometer comprising:

an input able to receive an injected signal;

a first arm and a second arm, the second arm comprising a first delay line able to introduce a first delay, an output able to supply an interference signal corresponding to the interference between a signal from the first arm and a signal from the second arm;

M detectors, each detector being able to detect a signal depending on the interference signal obtained at the output of each first interferometer;

a processing unit able to compute M demodulation signals, the $i^{th}$ demodulation signal being the product of $R_i+1$ functions, $R_i$ being a predetermined integer corresponding to the first delay of the first interferometer, the $p^{th}$ function being equal to:

$$S_{i,p}(t)=S(t-p\tau_i)$$

where p is an integer comprised between 0 and $R_i$, $\tau_i$ is the first delay that the delay line of the $i^{th}$ first interferometer can introduce, and S is a transform of the signal at the output of the $i^{th}$ first interferometer.

Furthermore, another aspect relates to a detection system, in particular lidar or radar, including:

a stage for transmitting an electromagnetic wave toward the target;

a stage for receiving an electromagnetic wave diffused by the target;

a device for generating at least one demodulation signal as defined above to demodulate an electrical signal that depends on the diffused wave received by the reception stage.

BRIEF DESCRIPTION OF THE DRAWINGS

The described technology will be better understood using the following description, provided solely as a non-limiting example and done in reference to the appended drawings, in which.

DETAILED DESCRIPTION OF CERTAIN INVENTIVE EMBODIMENTS

Figure 1:
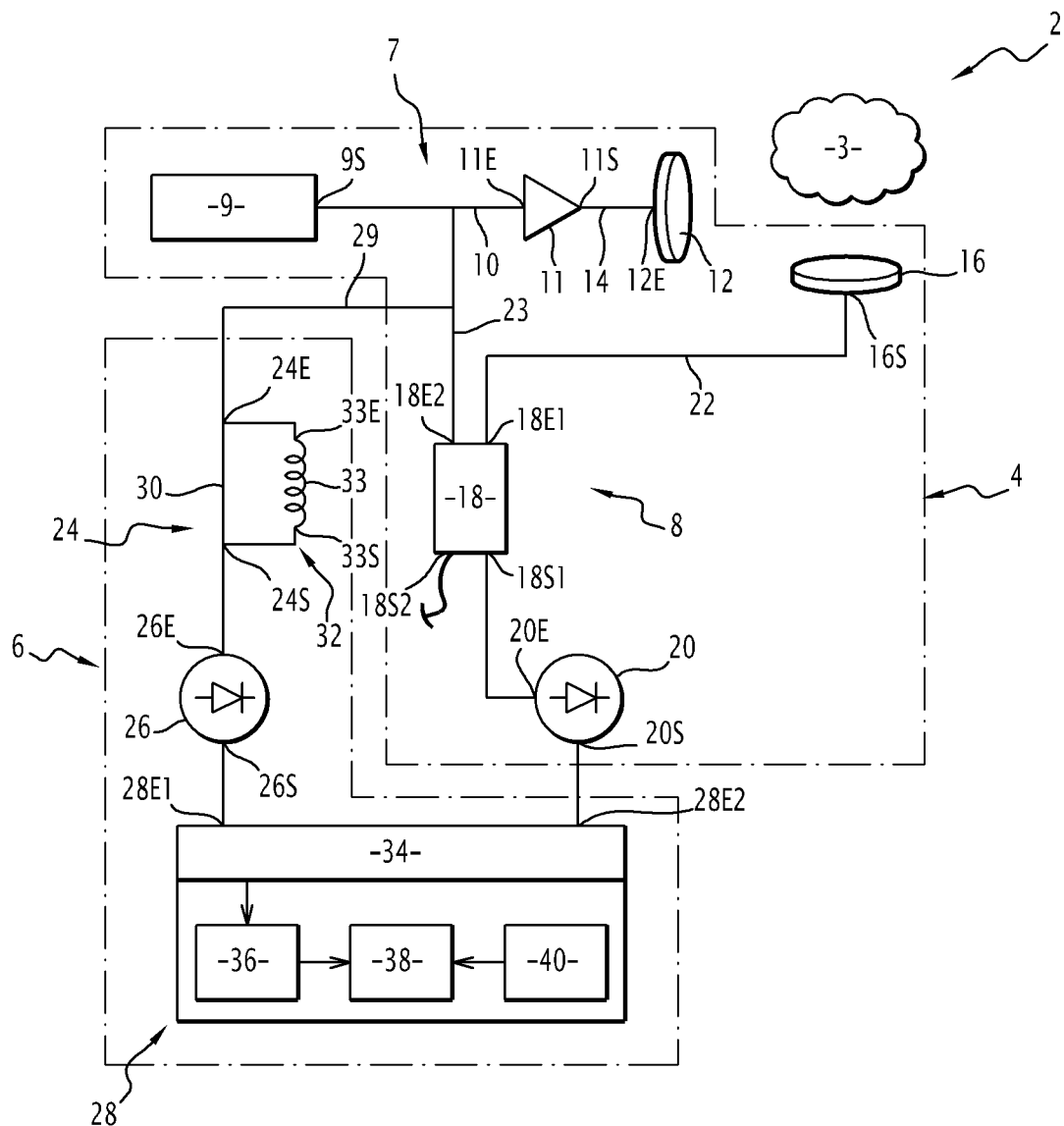
FIG. 1 is a diagrammatic illustration of a first detection system comprising a first processing device according to an embodiment.

A detection and analysis system 2 is shown in FIG. 1.

The detection system 2 is able to interact with a target 3. In particular, the detection system 2 is able to emit an electromagnetic wave toward the target 3. The target 3 is able to diffuse the electromagnetic wave emitted by the detection system 2.

The target 3 is for example a hard target or a diffuse target. The target 3 is mobile or immobile.

Furthermore, the detection system 2 is able to receive the electromagnetic wave diffused by the target 3.

The electromagnetic wave emitted by the detection system 2 is for example an optical wave.

"Optical wave" refers to an electromagnetic wave whose wavelength in a vacuum is comprised between 100 nm and 20 μm.

The detection system 2 includes a remote detection device 4 using lidar ("light detection and ranging") technology and a processing device 6 according to an embodiment.

The remote detection device 4 is suitable for transmitting and receiving optical waves, and generating an electrical signal that depends on the received optical waves. The processing device 6 is able to generate a demodulation signal to demodulate the electrical signal generated by the remote detection device 4 and perform that demodulation.

More specifically, the remote detection device 4 includes a transmission stage 7 for emitting an optical wave toward the target 3, and a reception stage 8 for receiving the optical wave diffused by the target 3 and generating electrical signals that depend on the received diffused optical wave.

The transmission stage 7 includes a laser source 9 able to generate an optical wave, an optical amplifier 11 able to amplify the optical wave, and a transmitter 12 able to transmit the amplified optical wave toward the target 3.

Alternatively, the transmission stage 7 does not include an optical amplifier.

The laser source 9 comprises an output 9S connected by a first optical fiber 10 to an input 11E of the amplifier 11. Furthermore, an output 11S of the amplifier 11 is connected by an optical transmitting fiber 14 to an input 12E of the transmitter 12.

The laser source 9 is able to generate an optical wave whose wavelength in the central vacuum is advantageously comprised between 1.4 µm and 1.6 µm, for example equal to 1.55 µm.

The laser source 9 desirably includes a control unit, not shown, for modifying the frequency of the optical wave emitted by the laser source 9 over time. For example, the control unit is suitable for varying the frequency of the wave emitted by the laser source 9 over time by following a sawtooth profile, with an amplitude equal to several megahertz and a period equal to several tens of microseconds. Optionally, the control unit is suitable for modifying the amplitude of the optical wave emitted by the laser source 9 over time.

The laser source 9 is for example a laser diode, such as a distributed feedback (DFB) laser diode.

The first optical fiber 10 is desirably a polarization maintaining fiber, advantageously a single-mode polarization maintaining fiber.

The amplifier 11 is able to amplify the wave emitted by the laser source 9 and injected at its input 11E. The amplifier 11 is suitable for providing, at its output 11S, an amplified wave whose frequency is substantially equal to the frequency of the wave injected at its input 11E. The amplifier 11 is for example a fiber amplifier or a semiconductor optical amplifier (SOA).

The transmitter 12 is able to modify the amplified optical wave injected at its input 12E to give it spatial phase and/or spatial amplitude and/or polarization properties desired by a user. For example, the transmitter 12 is able to focus the amplified optical wave injected at its input 12E at a predetermined distance, called "range", from the remote detection device 4.

The reception stage 8 includes a receiver 16 for receiving the diffused wave, a coupler 18 for causing the received diffused wave to interfere with another optical wave, and a first detector 20, also called "main detector", for detecting an optical interference signal and generating an electric current that depends on the optical interference signal.

The receiver 16 includes an output 16S, connected to a first input 18E1 of the coupler 18 by an optical receiving fiber 22. The coupler 18 includes a second input 18E2 connected to the output 9S of the laser source 9 by an optical fiber 23, called "local oscillator fiber", suitable for conveying part of the optical wave at the output of the laser source 9 toward the second input 18E2 of the optical coupler 18.

The first optical receiving fiber 22 is desirably a polarization maintaining fiber, advantageously a single-mode polarization maintaining fiber. Furthermore, the local oscillator fiber 23 is desirably a polarization maintaining fiber, advantageously a single-mode polarization maintaining fiber.

Alternatively, the local oscillator fiber 23 connects the second input 18E2 of the coupler 18 to the output 11S of the amplifier 11 to convey part of the amplified optical wave at the output of the amplifier 11 toward the second input 18E2.

The coupler 18 further includes a first output 18S1, connected to an input 20E of the detector 20, and a second output 18S2, not connected in this figure.

The receiver 16 is able to modify the received diffused wave to provide, at its output 16S, an optical wave having spatial phase and/or spatial amplitude and/or polarization properties desired by a user.

The coupler 18 for example has a coupling factor equal to 3 dB, i.e., the coupler 18 is able to provide, at each of its outputs 18S1, 18S2, an optical wave equal to half of the sum of the optical wave injected at its first input 18E1 and the optical wave injected at its second input 18E2.

The main detector 20 is able to provide, at its output 20S, an electrical signal, also called "signal to be demodulated", that depends on the optical signal applied at its input 20E by the first output 18S1, advantageously an electrical signal proportional to the optical power of the optical signal applied at its input 20E.

The main detector 20 is, for example, a photodiode or a photomultiplier.

The processing device 6 includes an interferometer 24 for providing an optical reference signal from part of the optical wave generated by the laser source 9, a second detector 26, also called "demodulation detector", for detecting the optical reference signal and generating an electrical signal, also called "reference signal", which depends on the optical reference signal, and a processing unit 28 for processing the reference signal.

The interferometer 24 includes an input 24E, connected by an optical fiber 29, also called "demodulation fiber", to the output 9S of the laser source 9, and an output 24S connected to an input 26E of the demodulation detector 26. The demodulation detector 26 further includes an output 26S, connected to a first input 28E1 of the processing unit 28. The processing unit 28 further includes a demodulation input 28E2 connected to the output 20S of the main detector 20.

The demodulation fiber 29 is desirably a polarization maintaining fiber, advantageously a single-mode polarization maintaining fiber.

The interferometer 24 includes a first arm 30 and a second arm 32 with different lengths.

The second arm 32 includes a delay line 33 including an input 33E and an output 33S. At its output 33S, the delay line 33 is able to provide a signal delayed by a time delay $\tau_0$ relative to a signal applied at its input 33E.

The delay line 33 is for example an optical fiber, desirably a single-mode fiber, advantageously a single-mode polarization maintaining fiber.

The length of the delay line 33 is desirably less than or equal to the range of the remote detection device 4, advantageously less than one fifth of the range, for example less than one tenth of the range. For example, the length of the delay line 33 is less than 40 meters, advantageously less than 20 meters, for example less than 10 meters.

Desirably, the interferometer 24 is such that an optical wave injected at its input 24E divides into two optical waves: a first optical wave circulating in the first arm 30 and a second optical wave circulating in the second arm 32. The optical power of the second optical wave is comprised between 45% and 55% of the optical power of the first optical wave, desirably equal.

The interferometer 24 is for example a Mach-Zehnder interferometer.

The processing unit 28 comprises an acquisition system 34 including two inputs that are the inputs 28E1, 28E2 of the processing unit 28, a memory 36 and a computer 38. The processing unit further includes an entry capability or input device 40.

The acquisition system 34 of the processing unit 28 is suitable for sampling each of the electric signals applied at its inputs 28E1, 28E2. The acquisition system 34 is also suitable for sending the sampled signals to the memory 36.

The memory 36 is suitable for storing the signals sampled by the acquisition system 34.

The computer 38 is suitable for processing the data stored in the memory 36, for example processing the data based on instructions entered by a user using the entry capability 40. In particular, the computer 38 is suitable for calculating a demodulation signal from the signal applied at the first input 28E1 of the processing unit 28, and for demodulating the signal to be demodulated, applied to the demodulation input 28E2 of the processing unit 28, by the calculated demodulation signal.

Advantageously, the computer 38 is suitable for synchronizing itself with the control unit of the laser source 9. For example, the computer 38 is suitable for processing the signals received during the increasing part of the sawtooth modulation and the signals received during the decreasing part of the modulation separately.

The operation of the detection system 2 will now be described in light of FIGS. 1, 2, 3 and 4.

The laser source 9 emits an optical wave, the frequency of which is controlled by the control unit. However, the phase of the optical wave fluctuates over time.

A first part of the optical wave emitted by the laser source 9 propagates in the first optical fiber 10 to the amplifier 11.

Furthermore, a second part of the wave emitted by the laser source 9, also called "local oscillator", propagates in the local oscillator fiber 23 to the second input 18E2 of the mixer 18.

Furthermore, a third part of the wave emitted by the laser source 9, called "collected wave", propagates in the demodulation fiber 29 up to the interferometer 24.

The amplifier 11 amplifies the first part of the wave emitted by the laser source 9 and provides an amplified optical wave at its output 11S.

The transmitter 12 transmits the amplified wave toward the target 3.

The target 3 diffuses the amplified wave transmitted by the transmitter 12. The spectrum of the diffused wave has properties representative of physical parameters of the target 3, such as its position or speed.

In fact, the time shift between the sawtooth patterns of the transmitted wave and the sawtooth patterns of the diffused wave is proportional to the distance at which the target 3 is located.

In fact, the time shift between the maximums of the sawtooth patterns of the transmitted wave and the maximums of the sawtooth patterns of the diffused wave is proportional to the speed of the target 3.

The receiver 16 captures part of the wave diffused by the target 3. The captured wave is injected into the first input 18E1 of the coupler 18 via the receiving fiber 20.

At its output, the coupler 18 provides an optical wave for example equal to half the sum of the wave injected into the first input of the coupler 18 by the local oscillator fiber 23 and the received wave injected into the second input of the coupler 18 by the receiving fiber 20. The optical wave available at the output of the coupler 18 is therefore an optical interference signal between the waves injected at the first and second inputs 18E1, 18E2 of the coupler 18.

The main detector 20 detects the optical interference signal and provides a real signal, also called "signal to be demodulated", at its output, which is proportional to the square modulus of the optical interference signal injected at the input of the detector 22.

The signal to be demodulated is applied to the second input of the processing unit 28. The signal to be demodulated is acquired and sampled by the acquisition system 34 to be recorded in the memory 36.

Figure 2:
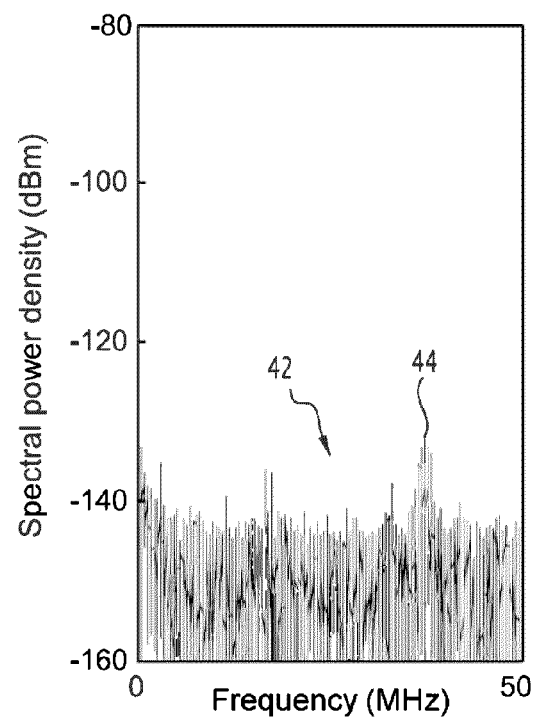
FIG. 2 is a spectrum of the signal before implementing the processing method according to an embodiment.

The signal to be demodulated has a spectrum 42, shown in FIG. 2. The spectrum 42 includes a peak of interest 44, with a central frequency equal to 37.3 MHz, an amplitude equal to −132 dBm/Hz and a full width at half maximum equal to 1.7 MHz, with a signal-to-noise ratio equal to 11 dB.

The spectrum 42 is obtained by transmitting an optical wave with an optical power equal to 200 mW toward a target 3 having an albedo equal to 12% and located 125 m away, after applying a linear frequency modulation with a slope equal to 45 MHz/μs to the laser source 9.

Within the meaning of the described technology, a power P, in watts, is expressed in dBm using the formula: P (dBm)=10 log [P (mW)/1 mW], log being the decimal logarithm operator.

The peak of interest 44 does not have a fineness and a signal-to-noise ratio that are sufficient to provide a precise estimate of its central frequency. A precise estimate of the central frequency of the peak of interest 44 then leads to a precise estimate of the speed and/or distance of the target 3.

The collected wave is injected at the input 24E of the interferometer 24. A first part of the collected wave propagates in the first arm 30 of the interferometer 24. A second part of the collected wave propagates in the second arm 32 of the interferometer 24, in particular in the delay line 33.

At its output 24S, the interferometer 24 provides an optical beat signal, called "beat wave". The beat wave results directly from the interference between the first part of the collected wave and the second part of the collected wave, delayed by the delay $\tau_0$ caused by the delay line 33.

Figure 3:
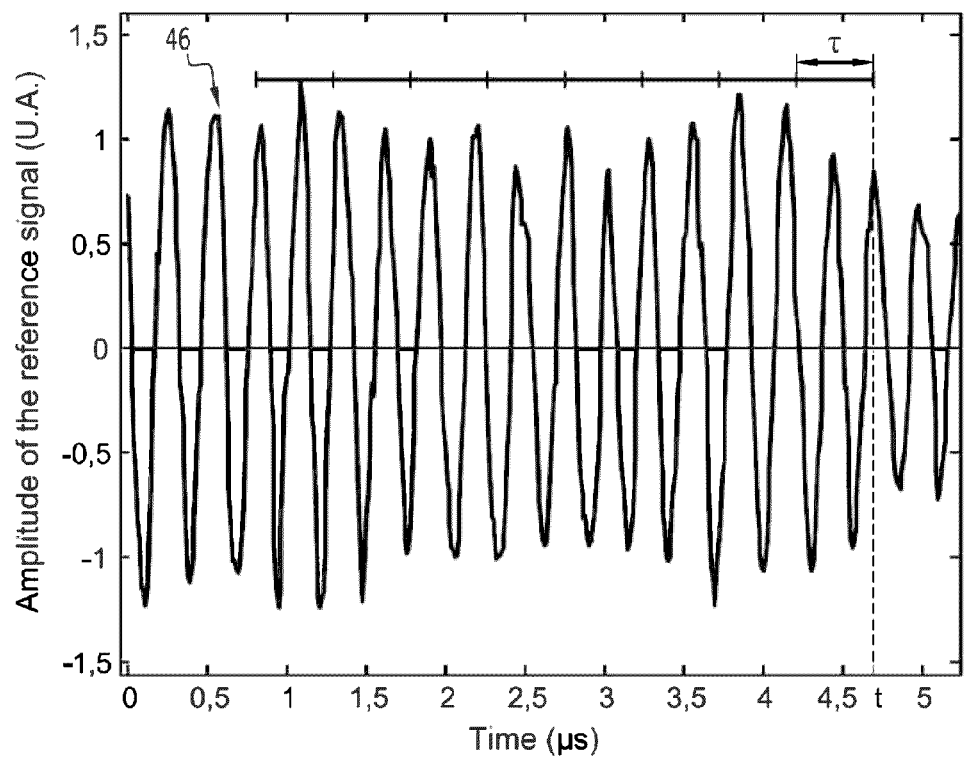
FIG. 3 is a graph of a reference signal obtained by implementing the processing method according to an embodiment.

The demodulation detector 26 detect the beat wave and provides, at its output, a real signal 46, also called "reference signal", shown in FIG. 3 and which is proportional to the square modulus of the beat wave injected at the input of the demodulation detector 26.

The reference signal 46 is applied to the first input of the processing unit 28. The reference signal 46 is acquired and sampled by the acquisition system 34 to be stored in the memory 36.

A user chooses a strictly positive integer K and enters it using the entry capability 40.

The computer 38 then computes a complex reference signal from the real reference signal 46.

The computer 38 first computes the Fourier transform of the real reference signal 46. Then the computer 38 computes an intermediate signal, obtained by canceling some of the components of the Fourier transform of the reference signal. Desirably, the computer 38 cancels the components whose frequencies have the same sign. For example, the computer 38 computes the intermediate signal by canceling the negative frequency components of the Fourier transform of the reference signal. The computer 38 lastly computes the complex reference signal, which is equal to the inverse Fourier transform of the intermediate signal.

The complex reference signal is called analytic representation of the signal.

Alternatively, the complex reference signal is obtained by first computing the traditionally-known Hilbert transform of the real reference signal 46 in the computer 38, then adding, to the real reference signal 46, its previously computed Hilbert transform.

Desirably, during the computation of the intermediate signal, the computer 38 also cancels the zero frequency component of the Fourier transform of the real reference signal.

The reference signal is then proportional to the following unitary modulus complex signal S(t):

$$S(t)=\exp[i\{\phi(t)-\phi(t-\tau_0)\}]$$

where $\phi$ is the phase of the wave transmitted by the laser source 9 and $\tau_0$ is the delay between the first arm 30 and the second arm 32 of the interferometer 24, or proportional to the conjugate of S(t).

The computer 38 next creates K+1 transition signals $S_p$, each transition signal $S_p$ being defined over the time interval [0; $\tau_0$] and being written:

$$S_p(t)=S(t-p\tau_0)=\exp[i\{\phi(t-p\tau_0)-\phi(t-(p+1)\tau_0)\}]$$

Thus, the computer 38 has created:

$$S_0(t)=\exp[i\{\phi(t)-\phi(t-\tau_0)\}]$$

$$S_1=\exp[i\{\phi(t-\tau_0)-\phi(t-2\tau_0)\}]$$

$$S_p(t)=\exp[i\{\phi(t-p\tau_0)-\phi(t-(p+1)\tau_0)\}]$$

$$S_K(t)=\exp[i\{\phi(t-K\tau_0)-\phi(t-(K+1)\tau_0)\}]$$

The computer 32 next computes a demodulation signal $S_d$ equal to the product of the K+1 transition signals.

In the complex exponential, all of the terms in $\phi(t-p\tau_0)$, with p being any integer comprised between 0 and K+1, cancel each other out, with the exception of $\phi(t)$ and $\phi(t-(K+1)\tau_0)$:

$$S_d(t) = \prod_{p=0}^{K} S_p(t) = \exp[i\{\varphi(t) - \varphi(t - (K+1)\tau_0)\}]$$

The expression of the demodulation signal $S_d$ is similar to that of a reference signal obtained with an interferometer whereof the second arm includes a delay line introducing a delay (K+1)$\tau_0$ between its input and its output.

The computer 38 next computes a demodulated signal equal to the product of the signal to be demodulated and the demodulation signal $S_d$, or the product of the signal to be demodulated and the conjugate of the demodulation signal $S_d$.

The user can adjust the value of the positive integer K such that the delay (K+1)$\tau_0$ induced by the demodulation signal $S_d$ compensates the time decorrelation between the collected diffused signal and the local oscillator, so as to increase the signal-to-noise ratio and the fineness of the peak of interest 44.

Figure 4:
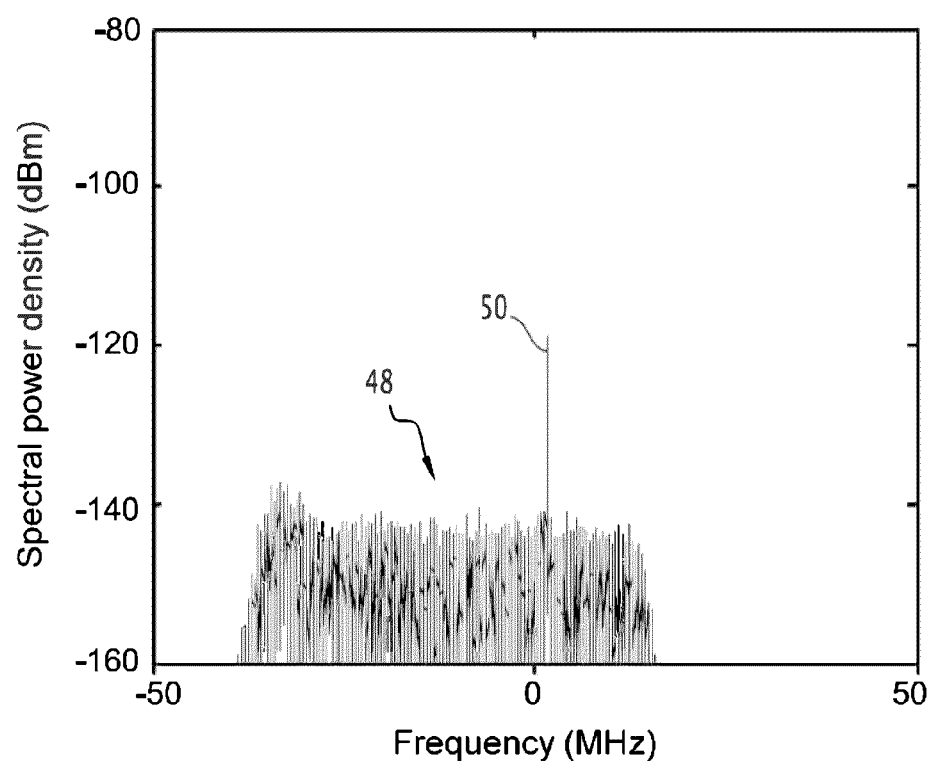
FIG. 4 is a spectrum coming from the signal of FIG. 2, after implementing the processing method.

The demodulated signal has a spectrum 48, shown in FIG. 4. The spectrum 48 of the demodulated signal includes a peak of interest 50, with a central frequency of 1.7 MHz, i.e., equal to the central frequency of the peak of interest 44 of the spectrum 42 of the signal to be demodulated, from which a first frequency shift has been taken related to the propagation of the wave from the remote detection device 4 to the target 3, and from the target 3 to the remote detection device 4, and to which a second frequency shift has been added by the Doppler effect related to the movement speed of the target 3, here equal to 0.2 m/s.

The peak of interest 50 of the spectrum 48 of the demodulated signal has an amplitude equal to -119 dBm, with a signal-to-noise ratio equal to 24 dB, and a full width at half maximum equal to 200 kHz.

The peak of interest 50 has a fineness and a signal-to-noise ratio that are sufficient to ensure a precise estimate of the speed of the target 3.

Figure 5:
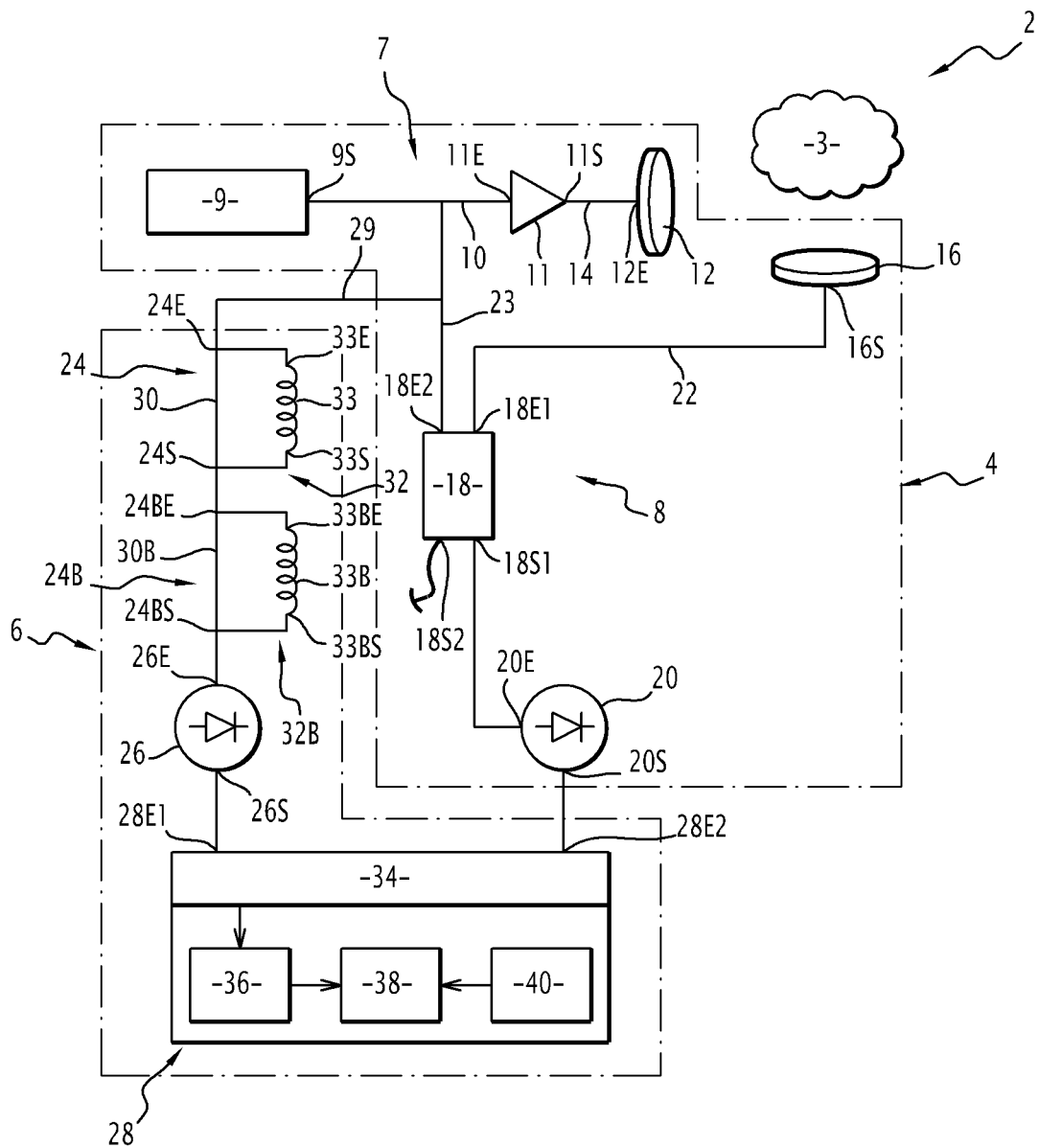
FIG. 5 is a diagrammatic illustration of a second detection system comprising a second processing device according to an embodiment.

According to a second embodiment of the detection system 2, the processing device 6 comprises a second interferometer 24B, as shown in FIG. 5.

The second interferometer 24B is for example a Mach-Zehnder interferometer.

The second interferometer 24B comprises an input 24BE, connected to the output 24S of the first interferometer 24, and an output 24BS connected to the input 26E of the demodulation detector 26.

The second interferometer 24B includes a first arm 30B and a second arm 32B with different lengths.

The second arm 32B includes a second delay line 33B including an input 33BE and an output 33BS. The second delay line 33B is able to provide, at its output 33BS, a signal delayed by a second time delay $\tau_1$ relative to a signal applied to its input 33BE.

The second delay line 33B is for example an optical fiber, desirably a polarization maintaining fiber, advantageously a single-mode polarization maintaining fiber.

The length of the second delay line 33B is different from the length of the delay line 33. Desirably, the ratio between the first delay $\tau_0$ and the second delay $\tau_1$ is greater than 5, desirably greater than 10, for example greater than 20.

Desirably, each interferometer 24, 24B is such that an optical wave injected at the input 24E, 24BE of the interferometer 24, 24B is divided into a first optical wave circulating in the first arm 30, 30B and a second optical wave circulating in the second arm 32, 32B. The optical power of the second optical wave is greater than the optical power of the first optical wave, advantageously two times greater, desirably five times greater, for example ten times greater.

During operation, the first interferometer 24 provides, at its output 24S, a first optical beat signal resulting from the interference between the first part of the collected wave and the second part of the collected wave, delayed by the delay $\tau_0$ caused by the delay line 33.

Unlike the embodiment previously described, the first optical beat signal is next injected at the input 24BE of the second interferometer 24B. A first part of the first optical beat signal propagates in the first arm 30B of the second interferometer 24B. A second part of the first optical beat signal propagates in the second arm 32B of the second interferometer 24B, in particular in the second delay line 33B.

The second interferometer 24B provides, at its output 24BS, a second optical beat signal resulting from the interference between the first part of the first optical beat signal and the second part of the first optical beat wave, delayed by the delay $\tau_1$ caused by the second delay line 33B.

The demodulation detector 26 detects the second optical beat signal and provides the reference signal at its output. The reference signal is an electric signal proportional to the square modulus of the second optical beat signal injected at the input of the demodulation detector 26.

The user chooses a first and second positive integer $K_1$, $K_2$, at least one of which is not zero, and enters them using the entry capability 40.

The computer 38 next creates ($K_1$+1) first transition signals $S_{1,p}$ and ($K_2$+1) second transition signals $S_{2,r}$.

The first transition signals $S_{1,p}$ are defined like the transition signals $S_p$ previously described.

Each second transition signal S2 is defined over the time interval [0; $\tau_1$] and written:

$$S_{2,r}(t) = S(t - r\tau_2) = \exp[i\{\phi(t - r\tau_1) - \phi(t - (r+1)\tau_1)\}]$$

S being the reference signal previously defined.

The computer 32 next computes a first demodulation signal $S_{1,d}$ equal to the product of the ($K_1$+1) first transition signals, and a second demodulation signal $S_{2,d}$ equal to the product of the ($K_2$+1) second transition signals:

$$S_{1,d}(t) = \prod_{p=0}^{K_1} S_{1,p}(t) = \exp[i\{\varphi(t) - \varphi(t - (K_1 + 1)\tau_0)\}]$$

$$S_{2,d}(t) = \prod_{r=0}^{K_2} S_{2,r}(t) = \exp[i\{\varphi(t) - \varphi(t - (K_2 + 1)\tau_1)\}]$$

The computer 38 next computes the demodulated signal equal to the product of the signal to be demodulated by the first modulation signal $S_{1,d}$, or by its conjugate, then by the second demodulation signal $S_{2,d}$ or its conjugate, as chosen by the user.

These successive demodulations may be interpreted as the introduction of a total delay equal to [±($K_1$+1)$\tau_0$+±($K_2$+1)$\tau_1$] in the local oscillator before its injection at the second input 18E2 of the coupler 18. The user can adjust the value of the integers $K_1$, $K_2$ such that the total delay [±($K_1$+1)$\tau_0$+ ±($K_2$+1)$\tau_1$] is as close as possible to the propagation time T of the waves from the transmitter 12 to the target 3, then from the target 3 to the receiver 16. The demodulation by the conjugate of the demodulation signal $S_{1,d}$, $S_{2,d}$ amounts to introducing a negative delay.

This results in compensating the time decorrelation between the local oscillator and the collected diffused signal, which is delayed by T relative to the local oscillator.

The delays $\tau_0$, $\tau_1$ being different, desirably in a ratio of the first delay $\tau_0$ to the second delay $\tau_1$ greater than 5, the user can first choose the value of the integer corresponding to the largest delay among the two delays $\tau_0$ and $\tau_1$ to roughly approach the total propagation time T, then choose the value of $K_2$ to more finely approach the total propagation time T after the value of $K_1$ has been chosen.

Figure 6:
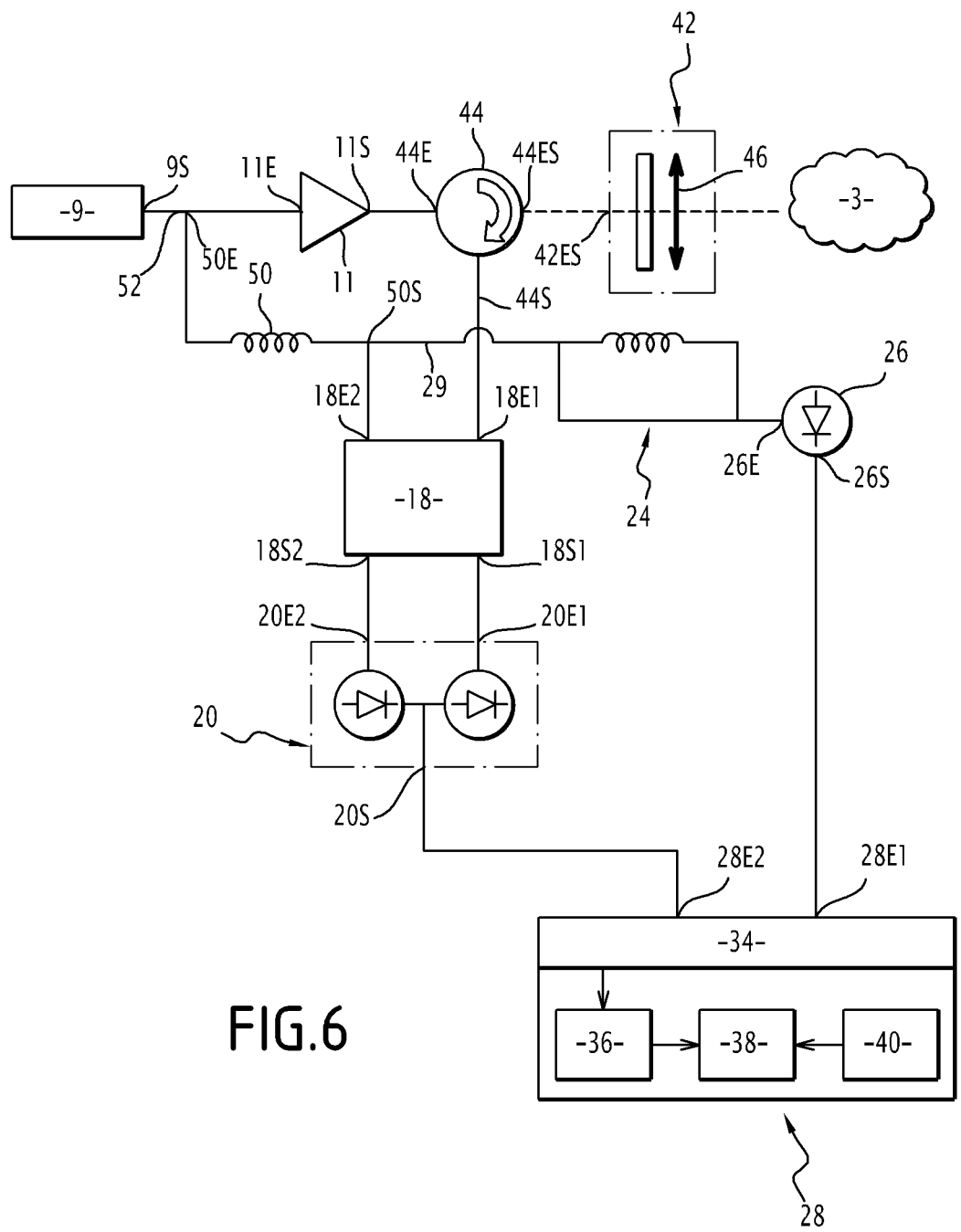
FIG. 6 is a diagrammatic illustration of a third detection system implementing the processing device of FIG. 1.

According to a third embodiment of the detection system 2, the transmitter 12 and the receiver 16 are combined in a transceiver 42, as shown in FIG. 6.

The transceiver 42 is suitable for transmitting an electromagnetic wave toward the target 3. The transceiver 42 is also suitable for receiving at least part of the electromagnetic wave diffused by the target 3.

The transceiver 42 has an input-output 42ES.

The remote detection device 4 then includes a circulator 44. The circulator 44 includes an input 44E, an output 44S and an input-output 44ES. The circulator 44 is able to convey an optical wave injected at its input 44E toward its input-output 44ES. Furthermore, the circulator 44 is able to convey an optical current injected at its input-output 44ES toward its output 44S.

The input-output 44ES of the circulator 44 is connected to the input-output 42ES of the transceiver 42.

The transceiver 42 for example includes a lens 46 in series with a quarter-wave plate 48.

The lens 46 is for example a converging lens.

The circulator 44 is for example a fibrous circulator or an assembly formed by a polarizing cube, a polarization separator and a wave plate.

Furthermore, the local oscillator fiber is replaced by a compensating delay line 50, comprising an input 50E and an output 50S.

The compensating delay line 50 is connected to the output 9S of the laser source 9 at a connection point 52. The output 50S of the compensating delay line 50 is connected to the input 24E of the interferometer 24. The output 50S is further connected to the second input 18E2 of the coupler 18.

The compensating delay line 50 causes a predetermined delay R between the signal injected at its input 50E and a signal emerging at its output 50S. The delay R is chosen to be equal to the total propagation time of a wave from the connection point 52 to the transceiver 42, then from the transceiver 42 to the first input 18E1 of the coupler.

The delay R allows a preliminary compensation, without computation by the processing unit 28, of the decorrelation between the local oscillator and the signal collected by the remote detection device 4. Such compensation allows the user, for a given delay $\tau_0$ of the interferometer 24, to reduce the value of the integer K, which leads to a desired refinement of the peaks of interest 44. This results in reducing the computation time of the computer 38.

As shown in the figure, the detector 20 of the remote detection device 4 is a balanced detector. The detector 20 comprises a first input 20E1, a second input 20E2 and an output 20S. The first input 20E1 is connected to the first output 18S1 of the coupler 18. The second input 20E2 is connected to the second output 18S2 of the coupler 18.

The balanced detector 20 is for example made up of two photodiodes with similar physical characteristics, mounted in anti-parallel.

Alternatively, the local oscillator is withdrawn at the output of the amplifier 11, the connection point 52 then being situated downstream from the amplifier 11.

Alternatively, the treatment device 6 includes N interferometers, N being a natural integer strictly greater than 2. The N interferometers are then positioned successively, the output of one interferometer being connected to the output of the following interferometer.

Each interferometer includes a first arm and a second arm. The second arm includes a delay line. The delay line of the $i^{th}$ interferometer, i being an integer comprised between 2 and N, comprises an input and an output, and causes a predetermined delay $\tau_i$ between a signal injected at its input and a signal emerging from its output.

The delays $\tau_i$ caused by the interferometers are desirably different in pairs.

The user enters N natural integers $K_1$, $K_2$, . . . , . . . , $K_N$ at least one of which is not zero. Each natural integer entered by the user is associated with a different interferometer. The computer 38 then computes N demodulation signals.

For any natural integer i between 1 and N, the corresponding demodulation signal $S_{i,d}$ is written:

$$S_{i,d}(t) = \prod_{p=0}^{K_i} \exp[i\{\varphi(\tau - p\tau_1) - \varphi(\tau - (p+1)\tau_i)\}] =$$

$$\exp[i\{\varphi(t) - \varphi(t - (K_i + 1)\tau_i)\}]$$

where $K_i$ is the integer entered by the operator associated with the $i^{th}$ interferometer, and $\tau_i$ is the delay induced by the delay line of the $i^{th}$ interferometer.

Figure 7:
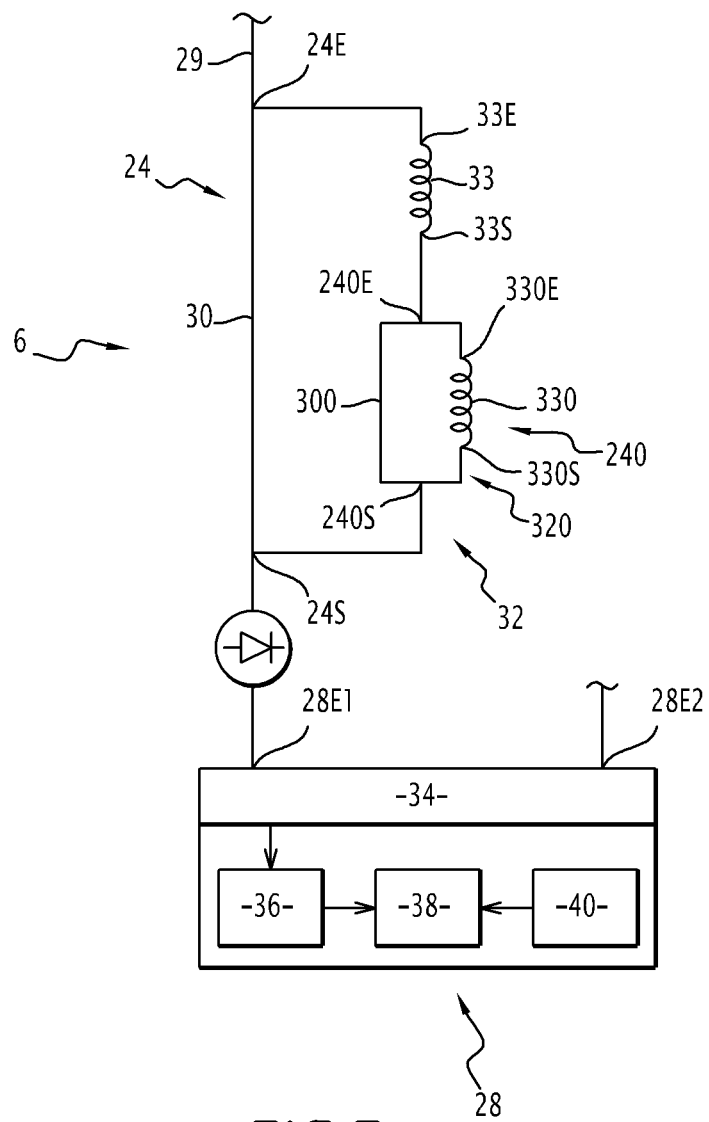
FIG. 7 is a diagrammatic illustration of part of a fourth detection system according to an embodiment.

According to a fourth embodiment of the detection system, part of which is shown in FIG. 7, the processing device 6 includes at least two overlapping interferometers.

"Two overlapping interferometers" refers to a first interferometer 24 and a second interferometer 240, such that one of the arms 30, 32 of the first interferometer 24 includes the second interferometer 240.

For example, the first interferometer is the interferometer 24 as described in reference to FIG. 5.

The second interferometer 240 is for example a Mach-Zehnder interferometer.

In the example, the second arm 32 of the first interferometer 24 includes the second interferometer 240, in series with the delay line 33. The second interferometer 240 comprises an input 240E, connected to the output 33S of the delay line 33. The interferometer 240 further includes an output 240S connected to the output 24S of the first interferometer 24.

The second interferometer 240 includes a first arm 300 and a second arm 320 with different lengths.

The second arm 320 of the second interferometer 240 comprises a delay line 330 including an input 330E and an output 330S. The delay line 330 is able to provide, at its output 330S, a signal delayed by a time delay $\tau'_1$ relative to a signal applied at its input 330E.

The delay line 330 of the second interferometer 240 is for example an optical fiber, desirably a single-mode fiber, advantageously a single-mode polarization maintaining fiber.

The length of the delay line 330 of the second interferometer 240 is desirably less than or equal to the range of the remote detection device 4, advantageously less than one fifth of the range, for example less than one tenth of the range. For example, the length of the delay line 330 is less than 40 meters, advantageously less than 20 meters, for example less than 10 meters.

Advantageously, the length of the delay line 330 is different from the length of the delay line 33. Desirably, the ratio of the larger of the delay $T_0$ of the delay line 33 of the first interferometer 24 and the delay $\tau'_1$ of the delay line 330 of the second interferometer 240, and the smaller of those delays $\tau_0$, $\tau'_1$, is greater than 2, desirably greater than 5, for example greater than 10.

Desirably, the second interferometer 240 is such that an optical wave injected at its input 240E divides into two optical waves: a first optical wave circulating in the first arm 300 and a second optical wave circulating in the second arm 320. The optical power of the second optical wave is then greater than the optical power of the first optical wave, advantageously two times greater, desirably five times greater, for example ten times greater.

During operation, the collected wave is conveyed by the demodulation fiber 29 from the laser source 9. The collected wave is injected at the input 24E of the interferometer 24. A first part of the collected wave propagates in the first arm 30 of the interferometer 24. A second part of the collected wave propagates in the second arm 32 of the interferometer 24. In particular, the second part of the collected wave propagates in the delay line 33 to form a delayed wave. The delayed wave is next injected at the input 240E of the second interferometer 240.

A first part of the delayed wave propagates in the first arm 300 of the second interferometer 240. A second part of the delayed wave propagates in the second arm 320 of the second interferometer 240. In particular, the second part of the delayed wave propagates in the delay line 330.

At its output 240S, the second interferometer 240 provides a first optical beat signal resulting from the interference between the first part of the delayed wave and the second part of the delayed wave, delayed by the delay $\tau'_1$ caused by the delay line 330.

The first optical beat signal next propagates to the output 24S of the first interferometer 24.

The first interferometer 24 then provides, at its output 24S, a second optical beat signal resulting from the interference between the first optical beat signal and the first part of the collected wave that is propagated in the first arm 30 of the first interferometer 24.

The demodulation detector 26 detects the second optical beat signal and provides the reference signal at its output. The reference signal is an electric signal proportional to the square modulus of the second optical beat signal injected at the input of the demodulation detector 26.

The user chooses a first and second positive integer $P_1$, $P_2$, at least one of which is not zero, and enters them using the entry capability 40.

The operation of the processing device 6 shown in FIG. 7 is next similar to the operation of the processing device 6 shown in FIG. 5, the delay $\tau'_1$ replacing the delay $\tau_1$. In fact, the second interferometer 240 has a role similar to the role of the second interferometer 24B of the processing device 6 shown in FIG. 5.

Alternatively, the second interferometer 240 is positioned between the input 24E of the first interferometer 24 and the input 33E of the delay line 33. The input 240E of the second interferometer 24 is then connected to the input 24E of the first interferometer 24, and the output 240S of the second interferometer 240 is connected to the input 33E of the delay line 33.

Alternatively, the first arm 30 of the first interferometer 24 includes the second interferometer 240.

Figure 8:
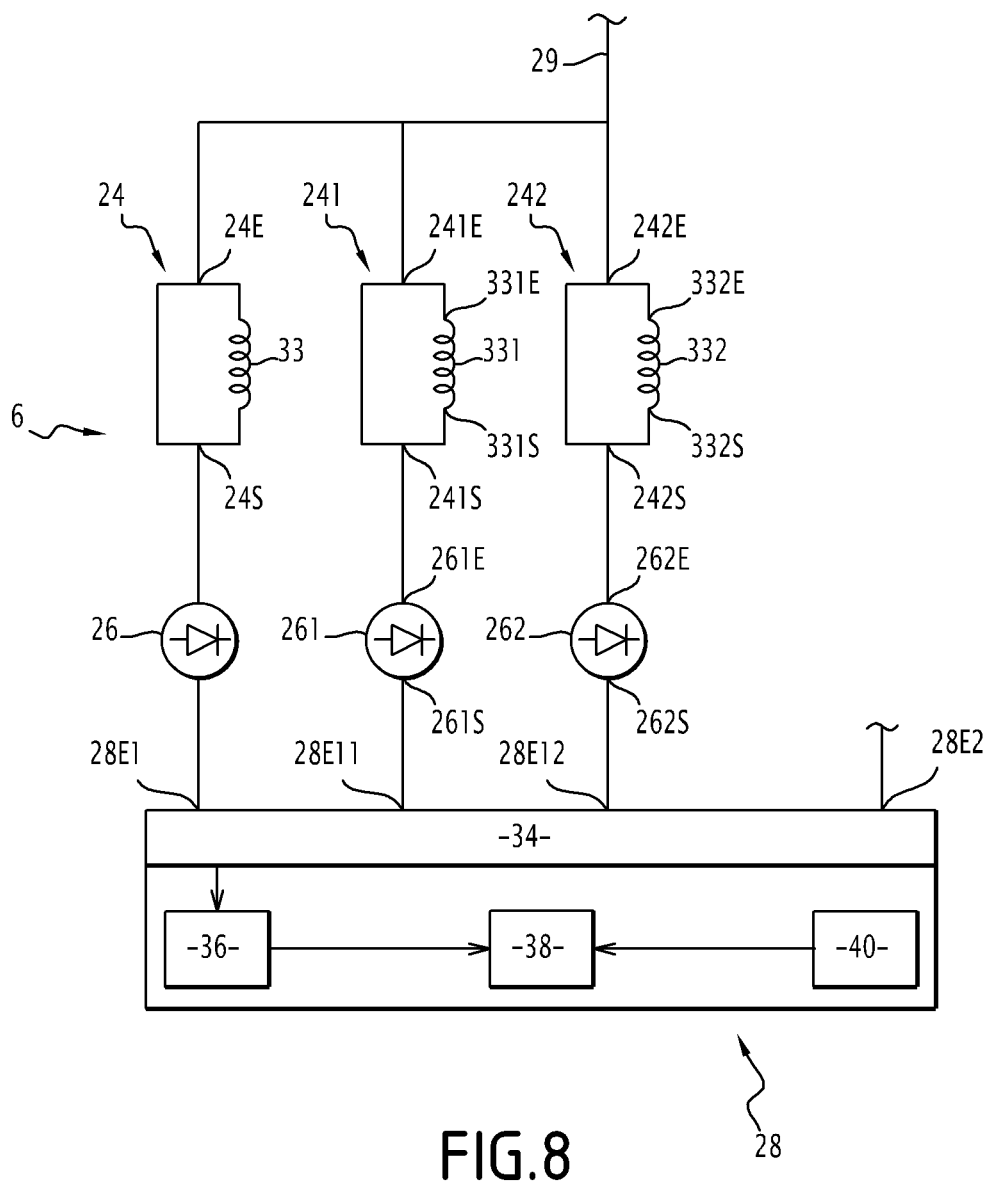
FIG. 8 is a diagrammatic illustration of part of the fifth detection system according to an embodiment.

According to a fifth embodiment of the detection system, part of which is shown in FIG. 8, the processing device 6 includes at least two interferometers in parallel, for example three interferometers in parallel.

The processing device 6 includes a first interferometer 24, as described in light of FIG. 1, a second interferometer 241 and a third interferometer 242. The processing device 6 also includes a first detector 26, as described in light of FIG. 1, a second detector 261 and a third detector 262.

Advantageously, the second and third detectors 261, 262 are similar to the first detector 26.

The second and third interferometers 241, 242 have a structure similar to the structure of the first interferometer 24.

The second and third interferometers 241, 242 respectively include a second delay line 331 and a third delay line 332.

The second delay line 331 includes an input 331E and an output 331S. The third delay line 332 includes an input 332E and an output 332S.

The second delay line 331 is able to provide, at its output 331S, a signal delayed by a time delay $\tau^*_1$ relative to a signal applied at its input 331E.

The third delay line 332 is able to provide, at its output 332S, a signal delayed by a time delay $\tau^*_2$ relative to a signal applied at its input 332E.

Advantageously, the lengths of the delay lines 33, 331, 332 are different by pairs. Desirably, the ratio between the bigger of the delay $\tau_0$ of the delay line 33, the delay $\tau^*_1$ of the second delay line 331 and the delay $\tau^*_2$ of the third delay line 332, and the smallest among those delays $\tau_0$, $\tau^*_1$, $\tau^*_2$, is greater than 2, desirably greater than 5, for example greater than 10.

The second interferometer 241 comprises an input 241E, connected to the demodulation fiber 29. The second interferometer 241 further includes an output 241S connected to an input 261E of the second detector 261.

The third interferometer 242 comprises an input 242E, connected to the demodulation fiber 29. The second interferometer 242 further includes an output 242S connected to an input 262E of the second detector 262.

Aside from the first input 28E1 and the demodulation input 28E2, the processing unit 28 includes a second input 28E11 and a third input 28E12.

The second input 28E11 is connected to an output 261S of the second detector 261. The third input 28E12 is connected to an output 262S of the third detector 262.

During operation, the collected wave is conveyed by the demodulation fiber 29 from the laser source 9. The collected wave is divided into three waves: a first collected wave, a second collected wave and a third collected wave. The first, second and third collected waves are injected at the input 24E, 241E, 242E of the first, second and third interferometers 24, 241, 242, respectively.

The user chooses a first, second and third positive integers R1, R2 and R3, at least one of which is not zero, and enters them using the entry capability 40. Each integer R1, R2, R3 is associated with a delay line 33, 331, 332.

For each interferometer 24, 241, 242, the operation of the processing device 6 of FIG. 8 is next similar to the operation of the processing device of FIG. 1. For each interferometer 24, 241 or 242, the computer 38 computes the reference signal, then a demodulation signal. The computer 38 next computes the demodulated signal, which is equal to the successive product of the signal to be demodulated by each demodulation signal.

Alternatively, at least one of the interferometers in parallel is in series with another interferometer.

Alternatively, at least one of the interferometers in parallel includes an overlapping interferometer.

Using at least one interferometer in such a demodulation method makes it possible to obtain a measurement of the phase of the wave generated by the laser source 9. Such a measurement of the phase of the generated wave allows better compensation of the time fluctuations of that phase.

Furthermore, the use of optical waves in such a demodulation method makes it possible to generate delays for example comprised between 10 ns and 500 µs. Such delays are able to offset the significant propagation distances of the waves from the transmitter 12 to the target 3, then from the target 3 to the receiver 16. For example, such delays are able to compensate propagation distances comprised between 3 m and 150 km. Such delays are greater than the delays obtained during the use of hyperfrequency waves.

Alternatively, the electromagnetic wave emitted by the detection system 2 is a hyperfrequency wave.

"Hyperfrequency electromagnetic wave" refers to a wave whose frequency is comprised between 0.1 GHz and 10 THz.

The remote detection device 4 is then a radio detection and ranging device.

The remote detection device 4 then includes components able to generate, transmit, receive and cause interference between or detect hyperfrequency electromagnetic waves.

In particular, the transmission stage 7 is able to generate a hyperfrequency wave and transmit the hyperfrequency wave toward the target 3.

In particular, the reception stage 8 is able to receive a hyperfrequency wave emitted by the target 3. The reception stage 8 is also able to generate an interference signal between the received wave and part of the wave generated by the transmission stage 7. The reception stage 8 is further able to detect the interference signal to generate a signal to be demodulated.

Furthermore, the processing device 6 is able to generate a demodulation signal from part of the hyperfrequency wave generated by the transmission stage 7, using the method previously defined.

In particular, the processing device 6 includes at least one interferometer comprising a first arm and a second arm. The second arm includes a delay line, traditionally known, to induce a predetermined delay in a hyperfrequency signal that crosses through the delay line. The interferometric signal is for example obtained with an electronic mixture.

The other operating modes of the other embodiments described above may be combined with one another, in whole or in part, to create other embodiments. In particular, the ratio between the greatest delay $\tau_0$, $\tau_1$, $\tau'_1$, $\tau^*_1$, $\tau^*_2$ introduced by a delay line 33, 33B, 330, 331 or 332 and the smallest of those delays $\tau_0$, $\tau_1$, $\tau'_1$, $\tau^*_1$, $\tau^*_2$ is desirably greater than 5, desirably greater than 10, for example greater than 20.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A method of generating N demodulation signals, N being a strictly positive integer, comprising:
   providing N input signals;
   injecting each input signal into one of at least one primary interferometer, each of the at least one primary interferometers including:
      an input in which each of the input signals is injected,
      a first arm and a second arm, the second arm comprising a first delay line introducing a first delay, and
      an output via which an interference signal exits corresponding to the interference between a signal from the first arm and a signal from the second arm,
   detecting N output signals, each output signal being a signal depending on the interference signal obtained at the output of each primary interferometer;
   choosing N positive integers that are not all equal to zero; and
   computing N demodulation signals $S_{i,d}(t)$, the $i^{th}$ demodulation signal being the product of $R_i+1$ functions, $R_i$ being the chosen integer that corresponds to the first delay of the $i^{th}$ primary interferometer, i being an integer between 1 and N, the $p^{th}$ function being equal to:

$$S_{i,p}(t)=S(t-p\tau_i)$$

where p is an integer comprised between 0 and $R_i$, $\tau_i$ is the first delay introduced by the delay line of the $i^{th}$ primary interferometer and S is a function of a discrete transform of the signal at the output of the $i^{th}$ primary interferometer.

2. The method according to claim 1, wherein at least one $i^{th}$ primary interferometer is connected to M additional interferometers, M being a strictly positive integer, the $j^{th}$ additional interferometer, j being an integer comprised between 1 and (M−1), including:
an input,
a first arm and a second arm, the second arm comprising a $j^{th}$ delay line introducing a $j^{th}$ second delay, and
an output via which a $j^{th}$ interference signal exits corresponding to the interference between a signal from the first arm and a signal from the second arm of the $j^{th}$ additional interferometer, the output of the $j^{th}$ additional interferometer being connected to the input of the $(j+1)^{th}$ additional interferometer;
the output of the primary interferometer being connected to the input of the first additional interferometer,
the method further comprising the following steps:
detecting the $i^{th}$ interference signal obtained at the output of the $M^{th}$ additional interferometer;
choosing M positive integers that are not all equal to zero; and
computing M demodulation signals $S_{j,d}$ the $j^{th}$ demodulation signal being the product of $K_j+1$ functions, $K_j$ being the selected integer that corresponds to the delay of the $j^{th}$ additional interferometer, I being an integer between 1 and M, the $p^{th}$ function being equal to:

$S_{j,p}(t)=S(t-p\tau_j)$ where p is an integer comprised between 0 and $K_j$ and S is a function of a discrete transform of the signal at the output of the $M^{th}$ additional interferometer.

3. The method according to claim 1, wherein at least one arm of an interferometer includes a supplementary interferometer, the supplementary interferometer comprising:
an input in which part of the input signal of the supplementary interferometer is injected;
a first arm and a second arm, the second arm comprising a delay line introducing a third delay; and
an output via which a second interference signal exits corresponding to the interference between a signal from the first arm of the supplementary interferometer and a signal from the second arm of the supplementary interferometer,
wherein the second interference signal is conveyed toward the output of the primary interferometer.

4. The method according to claim 1, wherein the ratio between the largest delay introduced by a delay line of one of the at least one primary interferometers and the smallest delay introduced by another delay line of another one of the at least one primary interferometers is greater than 5.

5. The method according to claim 1, wherein the ratio between the largest delay introduced by a delay line of one of the at least one primary interferometers and the smallest delay introduced by another delay line of another one of the at least one primary interferometers is greater than 10.

6. The method according to claim 1, wherein the ratio between the largest delay introduced by a delay line of one of the at least one primary interferometers and the smallest delay introduced by another delay of another one of the at least one primary interferometer line is greater than 20.

7. The method according to claim 1, wherein the input signal is received from a remote detection device having a predetermined spatial range, and: in which at least one delay line is an optical fiber, the length of which is less than or equal to the spatial range.

8. A demodulation method, comprising:
providing a signal to be demodulated; and
successively demodulating the signal to be demodulated using at least N demodulation signals obtained by implementing the method for generating N demodulation signals according to claim 1.

9. A device for generating N demodulation signals, N being a strictly positive integer, comprising:
N primary interferometers, each of the primary interferometers comprising:
an input configured to receive an injected signal;
a first arm and a second arm, the second arm comprising a first delay line configured to introduce a first delay; and
an output configured to supply an interference signal corresponding to the interference between a signal from the first arm and a signal from the second arm;
N detectors, each detector being configured to detect a signal depending on the interference signal obtained at the output of each primary interferometer; and
a processing unit configured to compute N demodulation signals $S_{i,d}(t)$, the $i^{th}$ demodulation signal being the product of $R_i+1$ functions, $R_i$ being a predetermined integer corresponding to the first delay of the primary interferometer, i being an integer between 1 and N, the $p^{th}$ function being equal to:

$s_{i,p}(t)=S(t-p\tau_i)$ where p is an integer comprised between 0 and $R_i$, $\tau_i$ is the first delay that the delay line of the $i^{th}$ primary interferometer can introduce, and S is a function of a discrete transform of the signal at the output of the $i^{th}$ primary interferometer.

10. A detection system, in particular lidar or radar, comprising:
a transmission stage configured to transmit an electromagnetic wave toward a target;
a reception stage configured to receive an electromagnetic wave diffused by the target; and
the device for generating at least one demodulation signal according to claim 9 to demodulate an electrical signal that depends on the diffused wave received by the reception stage.

* * * * *